Dec. 23, 1958  D. E. HOLLOWAY  2,865,584
AIRCRAFT PYLON EJECTOR
Filed March 19, 1956  3 Sheets-Sheet 1
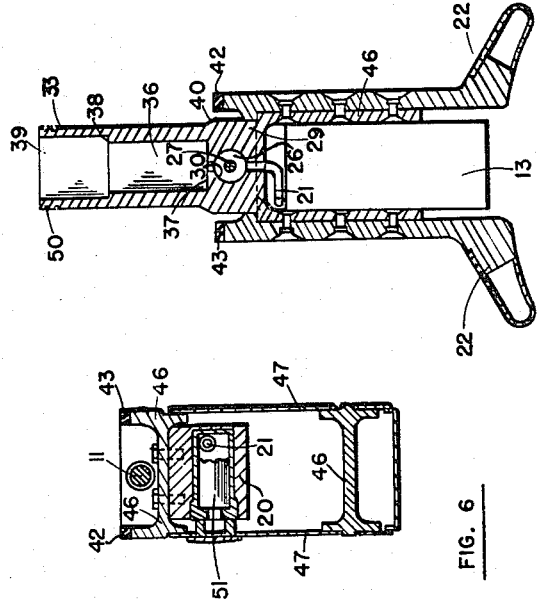
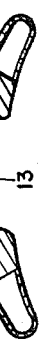
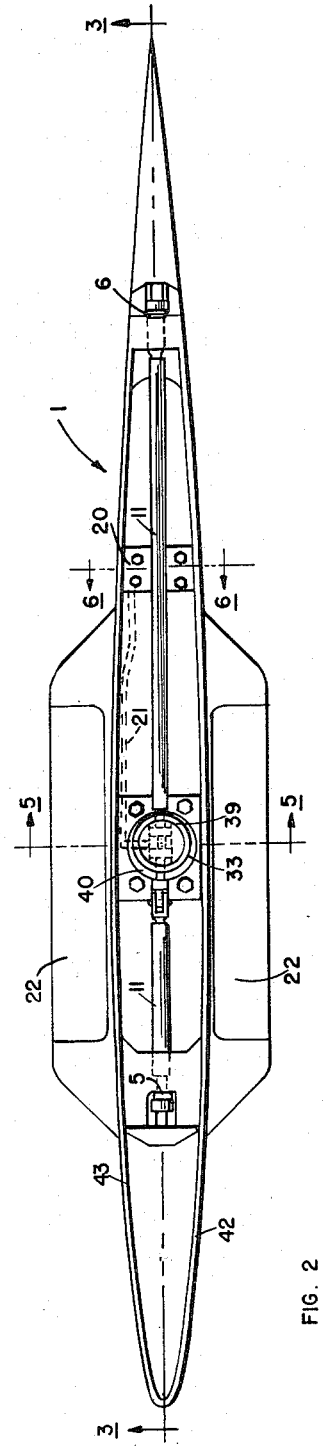
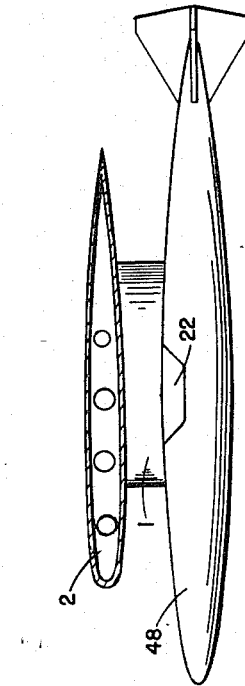
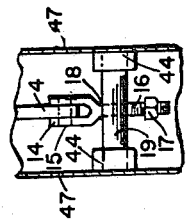
INVENTOR.
DANIEL E. HOLLOWAY
BY William R. Lane
ATTORNEY Dec. 23, 1958  D. E. HOLLOWAY  2,865,584
AIRCRAFT PYLON EJECTOR Filed March 19, 1956  3 Sheets-Sheet 2

INVENTOR.
DANIEL E. HOLLOWAY
BY
William P. Lane
ATTORNEY

Dec. 23, 1958　　　　D. E. HOLLOWAY　　　　2,865,584
AIRCRAFT PYLON EJECTOR
Filed March 19, 1956　　　　　　　　　　3 Sheets-Sheet 3

INVENTOR.
DANIEL E. HOLLOWAY
BY
William L. Lane
ATTORNEY

United States Patent Office 2,865,584
Patented Dec. 23, 1958

2,865,584

AIRCRAFT PYLON EJECTOR

Daniel E. Holloway, Manhattan Beach, Calif., assignor to North American Aviation, Inc.

Application March 19, 1956, Serial No. 572,411

7 Claims. (Cl. 244—137)

This invention relates to a suspension and release device and particularly relates to a pylon for releasably supporting a store such as a bomb, tank, or the like on a vehicle such as an aircraft, and provided with means for positively and sequentially releasing and propelling the pylon away from the vehicle after release or ejection of the store therefrom.

The critical need for positive and forceful ejection of stores such as fuel tanks, bombs and the like which are suspended from or otherwise carried by modern high performance aircraft has resulted in the development of a number of devices designed to fulfill this requirement. One such device is disclosed in U. S. Patent No. 2,822,207, assigned to North American Aviation, Inc., which shows an explosive actuated ejector mechanism, designed for containment within a streamlined fairing or pylon located under the wing or fuselage of an aircraft.

Upon release and ejection of the store suspended beneath the pylon, the pylon serves no further useful purpose and is but an added dead weight load and aerodynamic drag to be carried by the aircraft. Under certain conditions it is desirable that the pylon be jettisoned after release and ejection of the attached store. Dynamic factors, such as aerodynamic loads, aircraft maneuvers, and negative "g" conditions, necessitate the forceful ejection of the store away from a high performance aircraft in order to avoid striking portions of the aircraft. These same factors make it imperative that the pylon be forcibly ejected since it is located in such close proximity to the aircraft. Also the store carried by the pylon will in many instances have fins thereon to assist in guiding it away from the aircraft upon release therefrom. However the pylon generally has no such guiding fins and consequently its forcible ejection from the aircraft becomes of even greater importance to prevent it from violently contacting or striking the aircraft upon release.

The present invention contemplates a pylon ejector that will sequentially release and then forcibly eject a pylon. It utilizes the gas pressure developed from an explosive charge to fracture a predeterminately weakened member and thereby release the attaching means securing the pylon to the aircraft. This gas pressure then is admitted to an ejection chamber located in the aircraft structure through ports uncovered when the weakened member is fractured and the releasable attaching mechanism is disengaged. The gas pressure acts upon an integral pylon piston slidably mounted in the ejection chamber to propel the pylon and integral piston away from the aircraft. During the critical ejection period while the pylon is adjacent the aircraft, the pylon is guided in a straight line trajectory away from the aircraft by the coaction of the walls of the chamber and the piston slidably mounted therein.

Accordingly it is an object of this invention to provide a means for releasably suspending a pylon and for positively ejecting the same during flight.

Another object of this invention is to provide an ejectable pylon which can be ejected against any aerodynamic load or negative gravitational load imposed thereon by flight conditions.

It is also an object of this invention to provide an ejection device integral with the pylon that will eject the pylon in a predetermined straight line trajectory away from the aircraft.

It is a further object of this invention to provide an ejection device that will guide the pylon in an initial straight line movement away from the aircraft and will prevent the pylon from pivoting about a transverse axis while in proximity to the aircraft.

It is a still further object of this invention to provide a pylon ejection mechanism whereby the pylon is first sequentially released and then positively ejected by the action of an explosive charge.

These and other objects and advantages of the present invention will become apparent to those skilled in the art after reading the present specification and the accompanying drawings forming a part thereof, in which:

Fig. 1 is an installation view of a pylon attached to the wing of an aircraft and supporting an external store such as a fuel tank or bomb.

Fig. 2 is a plan view of the ejectable pylon of the present invention.

Fig. 5 is a transverse sectional view through the pylon and integral ejection piston taken in the plane of line 5—5 in Fig. 2.

Fig. 6 is a transverse sectional view through the pylon and firing chamber taken in the plane of line 6—6 in Fig. 2.

Fig. 7 is a transverse elevational view of the link adjusting means taken in the plane of line 7—7 in Fig. 4.

Figure 3:
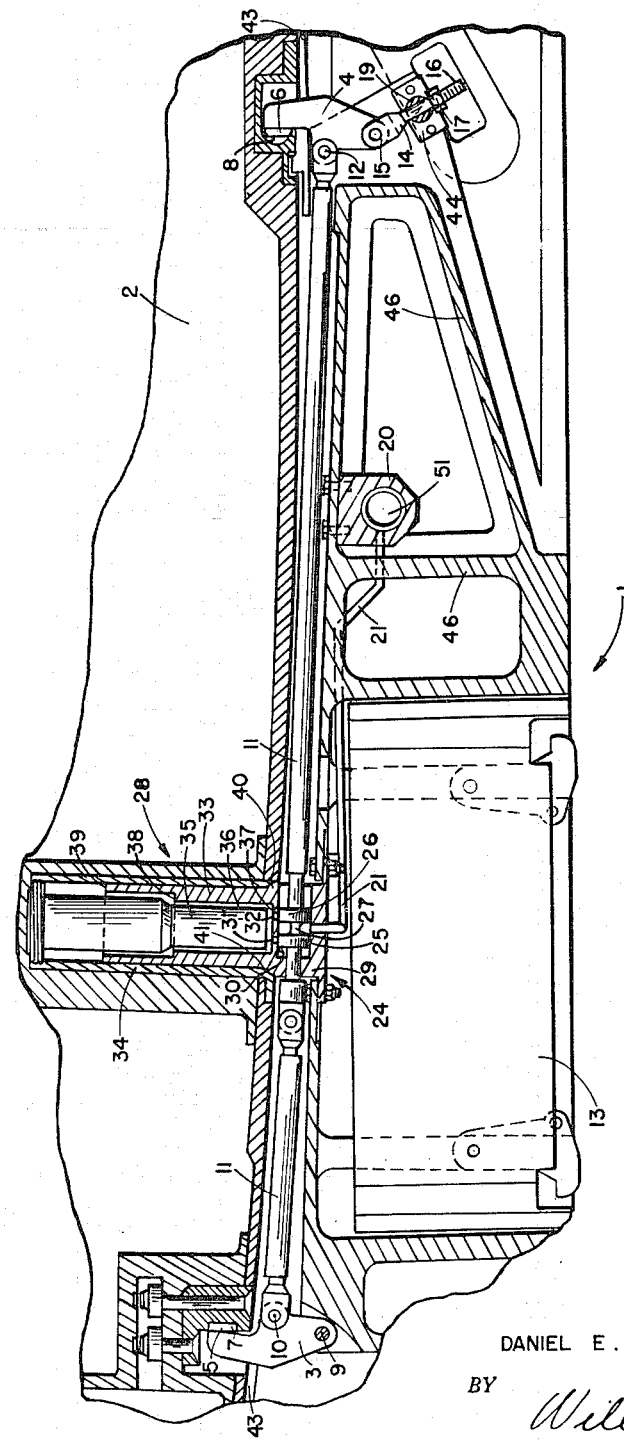
Fig. 3 is a partial longitudinal sectional view, on an enlarged scale, of the pylon and a fragmentary portion of the wing, taken in the plane of line 3—3 in Fig. 2 and showing the pylon attached to the aircraft.

Referring specifically to the drawings, wherein like reference characters have been used throughout the several views to designate like parts, and referring at first to Fig. 1, reference numeral 1 generally designates a streamlined pylon suspended beneath the wing 2 of an aircraft and supporting a store 48 such as a fuel tank, bomb or the like. As shown the pylon 1 has sway braces 22 integral therewith for steadying the suspended store 48. Although Fig. 1 shows a preferred embodiment of the present invention, the release and guided ejection device of this invention is also adaptable for mounting either at the surface or within the fuselage or body of an aircraft or missile. As shown, the pylon may be of a neutral or universal type construction and thus fit either the left or right wing of the particular aircraft. Pylon 1 may, in turn, contain suitable mechanism 13 for suspending and releasing a store such as a bomb or tank. Such a mechanism 13 is disclosed in detail in U. S. Patent No. 2,822,207 assigned to North American Aviation, Inc., the assignee of the present application.

The pylon itself is of a standard type construction consisting generally of one or more aluminum castings forming a webbed frame 46 to which aluminum sheets are suitably fastened to provide a smooth exterior skin 47. The various conduits and cables ordinarily contained in the pylon, such as are necessary for connection to a fuel tank, are not shown.

For securing the pylon to the aircraft wing, fore and aft longitudinally spaced hooks 3 and 4 are disposed to project upwardly through openings in the upper surface of the pylon frame and releasably engage complementary portions of the aircraft fixed structure to provide a two point suspension system for the pylon. The lower ends of hooks 3 and 4 are pivotally mounted on transverse pins 9 and 15, respectively, for rotation in the longitudinally extending medial plane of the pylon. Pin 9 is transversely mounted in and retained against translational movement by the fixed pylon structure while pin 15 is mounted for translational movement in a manner to be further described hereinbelow. Forward hook 3 has a rearwardly extending segmental end element 5 at its upper or projecting end adapted to engage a complementarily shaped socket 7 secured in or on the fixed structure of the aircraft. Element 5 and socket 7 may have a cylindrical, conical, hemispherical or other suitable configuration. For aerodynamic efficiency when the pylon is not installed this socket should preferably be recessed within the wing or other structure of the aircraft. Rearward hook 4 has a forwardly extending spherical segmental end element 6 at its upper end for engaging complementary hemispherical socket 8 secured to aircraft fixed structure. Sockets 7 and 8 and the socket engaging hooks 3 and 4 are thus disposed in opposite relationships so that the rearwardly facing element 5 of forward hook 3 must be pivoted forwardly about pin 9 for disengagement from socket 7 while forwardly facing end element 6 of rearward hook 4 must be swung rearwardly about pin 15 in order to disengage the end element from its respective complementary socket 8. Due to the sloping or tapered socket and the conical or ball-ended hook configuration, the reaction forces acting on hook ends 5 and 6 due to the weight of the pylon impose a positive moment about the hook pivot pins 9 and 15 tending to move the links outwardly into disengagement with the sockets.

Figure 4:
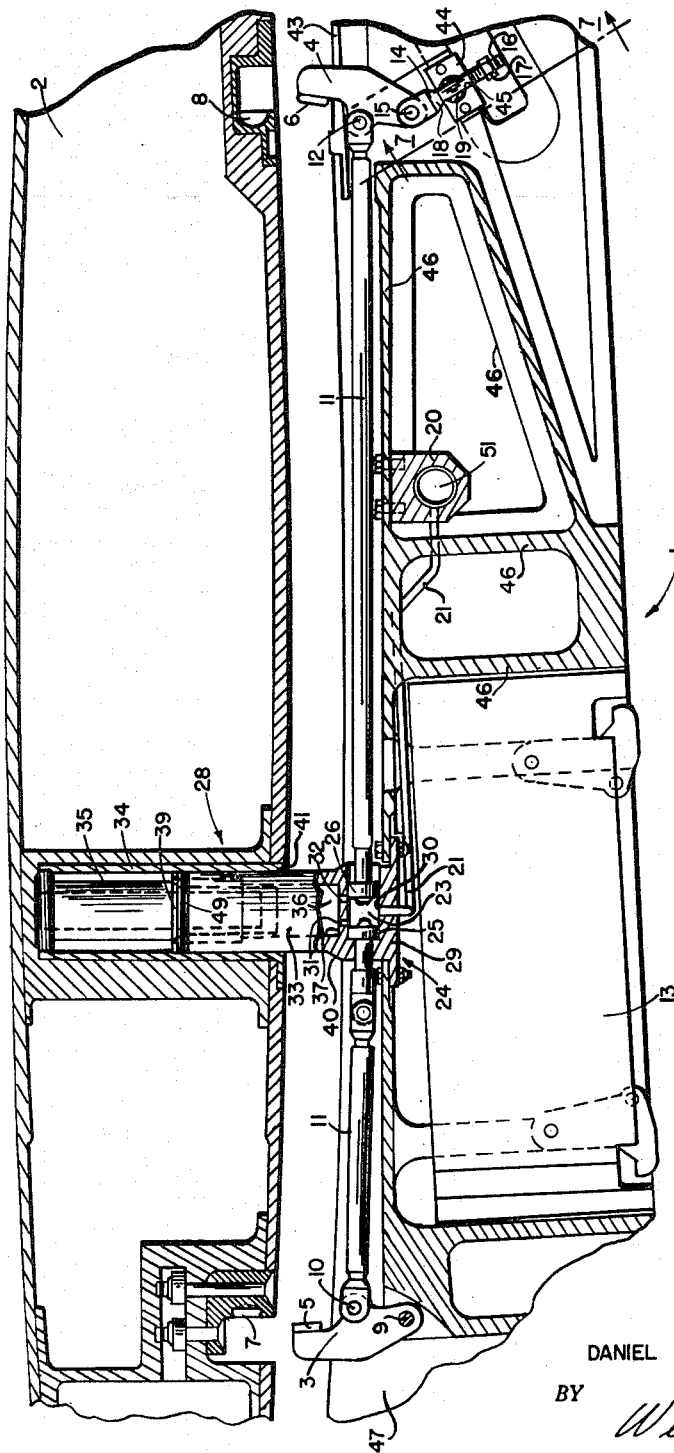
Fig. 4 is a partial longitudinal sectional view similar to that of Fig. 3 but showing the pylon released from the aircraft structure and being forcibly ejected and guided away from the aircraft in a direction normal to the wing surface.

To secure hook ends 5 and 6 in engagement with the sockets, inextensible tie rod 11 is arranged to rigidly connect hooks 3 and 4 so as to normally hold them against outward rotational movement. The tie rod has one end pivotally attached by pin 12 to hook 4 at a point intermediate the hook pivot pin 15 and ball element 6. The other end of the tie rod is similarly pivotally attached by a pin 10 to hook 3 at a point intermediate pivot pin 9 and ball element 5. Tie rod 11 may be of a single piece construction or for economy and convenience it may be comprised, as shown in Figs. 3 and 4, of a number of sections suitably joined together to form one integral rigid means for interconnecting and holding the hooks 3 and 4 in socket engaging relationship. The positive moment imposed on the hooks by the weight of the pylon induces a pre-loaded tensile stress in the tie rod.

Since the tie rod forms a rigid non-extensible connection of a length suitable for holding the hook ends in socket engagement, it is necessary to provide an adjusting means to allow for positioning and adjustment of the links when attaching or removing the pylon from an aircraft during loading and unloading ground maintenance operations. This adjusting means comprises a bifurcated member 14 supporting hinge pin 15 in bearing relationship in the bifurcated end portions thereof. As best shown in Fig. 7 member 14 has a shank 18 reciprocally supported in a diametral bore 45 through a rotatable pin 19 which is journaled in sidewall bearings 44. The outer end of the shank is threaded to form stud 16 which threadedly receives locking nut 17. In operation, when nut 17 is backed off or loosened from the position illustrated in Fig. 3, pin 15 is free to move generally to the left thus allowing hook 4 to pivot in a clockwise direction about pin 12 which, in turn, will permit disengagement of the hook end from socket 8 and will similarly free the end of hook 3 from its socket. This permits the pylon to be removed from the aircraft. Conversely when it is desired to attach the pylon to the aircraft the pylon is placed in juxtaposition to the wing or other aircraft structure and forward element 5 is disposed within forward socket 7. Nut 17 is then tightened to draw adjusting member 14 downward and to the right whereby pin 15 will be moved in a generally counterclockwise direction about pin 12, thereby pivoting the end elements of hooks 3 and 4 into their respective sockets and securing the pylon in place.

At a point intermediate the hooks 3 and 4, a pressure responsive hook-release mechanism 24 and an adjacent interconnected pressure responsive ejection mechanism 28 are predeterminately positioned. The exact location of these adjacent interconnecting mechanisms is principally dependent on availability of suitable fixed aircraft structure allowing formation of a cylindrical chamber therein. However, it is desirable in the preferred embodiment that the ejection mechanism be positioned opposite the center of gravity of the pylon so that the ejecting force will not have any tendency toward pivoting the pylon about this point and a clean break with the airplane will be obtained.

Pressure responsive hook-release mechanism 24 comprises a block 29, positioned at the aforesaid predetermined location and having a horizontal cylindrical bore 30 formed therein and concentrically enclosing an intermediate portion of tie rod 11. This intermediate tie rod portion comprises two opposed pistons or lands 25, 26 integral with the tie rod intermediate portion and spaced apart by a frangible reduced section 27 of the tie rod. Pistons 25 and 26 are normally stationary until operation of the release mechanism by fracture of frangible section 27, which is constructed to rupture at a predetermined pressure on the opposed pistons 25 and 26. Upon rupture of the frangible predeterminately weakened portion 27, pistons 25 and 26 are slidable in bore 30, to the opposite ends thereof, and the two halves of the fractured tie rod are movable outwardly whereby the hooks 3 and 4 are freed for pivotal movement and become disengaged from their respective sockets. As previously noted, tie rod 11 may be of one piece construction, but is preferably composed of jointed segments so that the length of the tie rod may be adjusted to securely hold the hooks in engagement with the sockets and so that the integral pistons may also be adjusted to normally cover passageways 31 and 32 located in the upper portion of block 29. These passageways connect bore 30 and the interior 36 of the hollow cylindrical piston 33, which piston 33 extends laterally upwardly from integral block 29 above the upper surface of the pylon. When pistons 25 and 26 move outwardly upon fracture of portion 27, passageways 31 and 32 are uncovered, thus establishing communications between bore 30 and the interior 36 of hollow piston 33. Piston 33 should be axially aligned with the center of gravity of the pylon, as previously stated, in order to prevent imparting any rotational movement to the pylon.

A breech 20 is provided in the pylon to receive an explosive charge or cartridge 51 for generating the pressurized gas necessary to actuate the release and ejection mechanisms. This breech may include a single aperture, as shown in Figs. 3, 4 and 6 for the reception of a single explosive charge or cartridge; or it may include a plurality of interconnected apertures for the reception of a plurality of explosive charges. Breech 20 communicates through passageway 21 with a chamber 23 formed in bore 30 between normally stationary pistons 25 and 26. Pistons 25 and 26 are of a sufficient axial thickness to cover ports 31 and 32 respectively when the tie rod 11 is adjusted to hold hooks 3 and 4 in engagement with wing sockets 7 and 8.

At a point intermediate the sockets 7 and 8 and opposite piston 33, a cylinder 34 is located in a wing spar or other fixed structure of the aircraft. The upper end of cylinder 34 is closed, while the lower end is open to ambient atmosphere. A concentric spacer plug 35 depends from the closed upper end of the cylinder and displaces most of the volume of the cylinder. Hollow piston 33 is slidable within the chamber of cylinder 34 with spacer plug 35 displacing most of the volume within the hollow piston. Piston 33 has a suitable number of gas pressure sealing rings 49 in grooves 50 as required. The bottom inner edge of cylinder 34 is beveled as indicated at 41 with piston 33 having a complementary beveled surface 40. When adjustment of the tie rod is made, securing ball ends 5 and 6 within their respective sockets, the two beveled bearing surfaces 40, 41 are drawn tightly together minimizing any tendency toward vibration between the piston and the cylinder. Piston 33 may include any suitable number of grooves and seal rings as may be required.

In operation, upon explosion of a charge in breech 20, the high pressure explosive gases flow through passageway 21 into chamber 23 where they react against the oppositely disposed pistons 25 and 26. This force on the pistons, together with the preloading on the tie rod resulting from attaching the pylon by means of the hook and socket arrangement, will be sufficient to fracture frangible portion 27, thereby severing the tie rod. The gas pressure drives the two sections of the tie rod apart to the position shown in Fig. 4 which pivots each of links 3 and 4 so as to free the hook end elements from the sockets and thereby releases the pylon from the wing.

As the tie rod portions are driven apart, pistons 25 and 26 uncover passageways 31 and 32 allowing pressurized gas to flow into the hollow piston 33 and into the narrow annular spaces between the piston 33 and the concentric spacer plug 35. Thus the gases react against the bottom 37, shoulder 38 and top 39 of the piston, driving the piston downwardly and thereby ejecting the pylon from the aircraft. Proper sequencing of the release and ejection devices is automatic with the invention as disclosed. Ports 31 and 32 cannot be uncovered so as to allow introduction of the pressurized gas into the hollow ejection piston prior to fracture of the frangible tie rod portion and release of the ball-ended links from the sockets. This assures that the proper sequencing of the release and ejection operations takes place.

As the pylon is ejected and the piston slides out of the cylinder, it serves to guide the pylon during the stroke within the cylinder and this keeps the pylon in a straight line during its initial ejection preventing its pivoting and striking the wing. When positioned within the cylinder, the piston also acts as a sway brace and forms a stable, rigid connection between the pylon and the wing. Beveled bearing surfaces 40 and 41 greatly assist in providing such a stable close coupled arrangement.

This device also incorporates the feature of interchangeability. The relatively short piston illustrated in Figs. 3, 4 and 5 will fit within a shorter cylinder which may be provided at a different portion of the wing or aircraft structure. The pylon itself is also interchangeable for right and left sides of the wing, the seal between the pylon and wing being effected by sponge rubber strips 42 and 43. These elements are compressed to accommodate the taper of the wing, thereby permitting the pylons to be used on either side of the aircraft.

Plug 35 may be threaded on its lower end to provide an attachment for a fairing plate to cover the opening of the wing cylinder when the pylon is not in use. This plug, by filling most of the cylinder volume, assures that less aerodynamic losses occur when the pylon has been ejected than would be the case with an empty cylinder.

While a particular embodiment of this invention has been illustrated and described herein, it will be apparent that various changes and modifications may be made in the construction and arrangement of the various parts without departing from the spirit and scope of this invention in its broader aspects or as defined in the following claims:

I claim:

1. In combination with an aircraft having recessed attachment sockets and a chamber formed therein, a store supporting pylon device for suspension and ejection from said aircraft comprising a duality of attaching hook means adapted for releasable attachment to said attachment sockets; a tie rod means releasably interconnecting said hook means for securing the same in attaching relationship to said aircraft; said tie rod including a weakened portion adapted to release said attaching hook means upon rupture of said weakened portion; a cylinder concentrically mounted about said tie rod including the weakened portion thereof; pistons integral with said tie rod located one near each end of said weakened portion and reciprocally mounted in said cylinder and forming therewith an expansible chamber; and explosion chamber means communicating with said cylinder for pressurizing said expansible chamber and rupturing said weakened portion whereby said attaching hook means may be released from the attachment sockets; a piston means integral with and extending from said pylon device and reciprocally inserted into said aircraft chamber adapted for propelling and guiding said pylon device away from said aircraft substantially along a predetermined straight line path upon the application of pressure to the piston means; said piston means communicating with said concentric chamber and being operable subsequent to movement of said pistons.

2. In combination with a body having attaching portions, a device for suspension and ejection from said body comprising hook means for releasably engaging said attaching portions and suspending said device from said body; a breech member adapted to receive a cartridge means therein; a frangible pressure responsive means operatively contacting said hook means for releasing the same connected with said breech member for receiving gases from an explosion in said breech member; a second pressure responsive means connected with said breech member for receiving gases from an explosion in said breech member and integrally ejectable with said device for forcibly propelling it away from said body upon the application of said gases to said second pressure responsive means, said frangible pressure responsive means being interposed between said breech member and said second pressure responsive means and preventing application of gases to said second means until a time subsequent to fracture of said frangible means and release of said hook means whereby the device will be first sequentially released from the attaching portions and then propelled away from said body.

3. In combination with an aircraft having attaching portions and containing an open-ended chamber therein, a pylon device for suspension and ejection from said aircraft comprising a plurality of hook means for releasably engaging said attaching portions; a frangible means releasably interconnecting said hook means and securing them in attaching relation to said aircraft; a first pressure responsive means integral with said frangible means for rupturing the same whereby said attaching hook means may be disengaged from said aircraft attaching portions; a piston means extending from said pylon device and ejectable therewith reciprocably mounted in said open-ended chamber and operable upon application of pressurized fluid thereto for propelling said pylon device away from said aircraft upon release of the hook means; a breech member in said pylon device adapted to receive a powder charge communicating with said first pressure responsive means and with said open-ended chamber; and powder charge means in said breech operable upon ignition thereof to produce pressurized gas for effecting operation of said pressure responsive means to rupture said frangible means, said pressure responsive means being interposed between said breech member and said chamber and preventing communication therebetween to thereby prevent the application of pressurized gas to said piston means until after fracture of said frangible means whereby the piston device will be sequentially first released and then ejected from said aircraft.

4. In combination with an aircraft having attachment members and including an open-ended chamber therein, a pylon for suspension and ejection from said aircraft comprising a plurality of attaching pivotal hook means adapted for releasable attachment to said attachment members; an axially inextensible member interconnecting said hook means and securing the same in attaching relation to said aircraft; a cylinder means axially concentric about a portion of said inextensible member; piston means integral with said inextensible member reciprocably mounted in said concentric cylinder means, said inextensible member having a frangible portion integral therewith; a breech member adapted to receive a cartridge means therein; conduit means interconnecting said breech means and said cylinder means whereby pressurized gas formed in said breech means acts on said piston means to fracture said frangible portion and release said attaching hook means from the aircraft attachment members; and a pressure responsive means integral with said pylon slidably mounted in said open-ended chamber, said chamber communicating with said concentric cylinder means, and said piston means preventing communication of pressurized gas to said pylon pressure responsive means from said concentric cylinder means until fracture of said frangible portion thereby permitting sequential release of said attaching hook means and ejection of said pylon.

5. In combination with an aircraft having attaching portions and an open-ended cylinder therein, a pylon for suspension and ejection from said aircraft comprising attaching pivotal hook means adapted for releasable attachment to said attaching portions; means releasably interconnecting said hook means; a first cylinder and piston means integral with said interconnecting means for releasing said hook means from said aircraft attaching portions upon application of pressure to said piston means; a second piston means integral with said pylon and adapted for slidable reception in said open-ended aircraft cylinder, said second piston means being positioned intermediate said attaching means and substantially in the plane of the center of gravity of said pylon, for propelling and guiding said pylon away from the aircraft substantially along a predetermined straight path upon the application of pressure to said second piston means; a breech member in said pylon adapted to receive a powder charge for the generation of pressurized gases upon explosion of said powder charge; conduit means interconnecting said breech means and said first cylinder and piston means and said open-ended cylinder, said first piston means being interposed in said conduit means interconnecting the breech member and the open-ended cylinder and preventing communication therebetween prior to release of said hook means whereby said integral second piston means and pylon will be sequentially ejected following release of said hook means.

6. An aircraft arrangement comprising in combination an aircraft having an aerodynamically smooth surface, said aircraft having recessed hook engaging socket means and a recessed cylinder therein each open to said surface; a store-carrying device adapted for suspension and ejection from said aircraft comprising hook means for releasably engaging said socket means and suspending said device from the aircraft; a frangible means interconnecting and retaining said hook means in engagement with said socket means and being rupturable to release the hook means from said socket means; a first cylinder and piston means operatively connected to said frangible means for rupturing the same upon application of pressurized fluid thereto; a breech member adapted to receive a cartridge means for the formation of pressurized combustion gas, conduit means interconnecting said breech member and said first cylinder and piston means and supplying pressurized gas thereto upon combustion of the cartridge means; a second piston means integral with said store-carrying device slidably receivable in said aircraft recess cylinder for propelling the device away from said aircraft; and conduit means for providing communication between said recessed cylinder and second piston means and the breech member subsequent to rupture of said frangible means whereby said store-carrying device is sequentially released and ejected from said aircraft to leave an aerodynamically smooth unencumbered surface.

7. In combination with a body having attaching portions, a device for suspension and ejection from said body comprising hook means for releasably engaging said attaching portions and suspending said device from said body; frangible pressure responsive means releasably interconnecting and retaining said hook means in engagement with said attaching portions, said frangible pressure responsive means including a cylinder having spatially displaced pistons therein separated by a frangible element; a second pressure responsive means including a piston integral with said device and ejectable therewith for forcibly propelling the device away from said body upon the application of pressure to said second means; an explosion chamber means in said device adapted to receive a cartridge means therein for the generation of combustion gases upon ignition of said cartridge means, a passageway connecting said explosion chamber means with said cylinder whereby pressurized gases may be applied to said pistons to fracture the frangible element and release said hook means, a second passageway connecting said cylinder and said second pressure responsive means after fracture of said frangible element and release of the hook means for applying pressurized gas to said second pressure responsive means whereby said device will be ejected from said body following release of said hook means.

References Cited in the file of this patent

UNITED STATES PATENTS

| | | |
|---|---|---|
| 2,466,980 | Bronson | Apr. 12, 1949 |
| 2,489,984 | Shoemaker | Nov. 29, 1949 |
| 2,516,902 | Musser | Aug. 1, 1950 |
| 2,699,908 | Fletcher | Jan. 18, 1955 |
| 2,736,522 | Wilson | Feb. 28, 1956 |
| 2,822,207 | Steinmetz | Feb. 4, 1958 |

FOREIGN PATENTS

| | | |
|---|---|---|
| 609,456 | Great Britain | Sept. 30, 1948 |
| 875,292 | France | June 15, 1942 |